May 9, 1967  G. TOMELLERI  3,318,349

DEVICE FOR STONING FRUITS

Filed Dec. 14, 1964  2 Sheets-Sheet 1

INVENTOR
Giordano Tomelleri

BY Shoemaker and Mattare

ATTORNEYS

United States Patent Office 3,318,349
Patented May 9, 1967

3,318,349
DEVICE FOR STONING FRUITS
Giordano Tomelleri, 22 Via Montorio, Verona, Italy
Filed Dec. 14, 1964, Ser. No. 417,916
Claims priority, application Italy, Dec. 17, 1963,
25,874/63
4 Claims. (Cl. 146—27)

The invention relates to a mechanical device and apparatus for removing stones from fruits, containing a stone and is particularly, but not exclusively, concerned with a device for removing stones from olives.

One object of the present invention is to provide a stone removal operation wherein the virtually cylindrical cavity made in the body of the fruit by the expulsion of the stone has its median longitudinal axis corresponding to or virtually parallel with the median longitudinal axis of the fruit itself.

Another object of the present invention is to avoid the body of the fruit being subjected, during the stone removal process, to harmful compressive forces, said forces being minimised as far as possible.

A further object is to hold the fruit firm in the cell in which it is housed during and after the stone removal operation as well as, during successive processing. The device also avoids the need of orientating operations relative to the cavity when the cavity is to be stuffed mechanically, such as is the case where the fruit is an olive.

Other objects of the invention will become apparent during the course of the description which follows and which is to be considered in conjunction with the attached drawings which illustrate one embodiment of the present invention and wherein:

FIGS. 3, 4 and 5 are median vertical cross-sections through the means for stone removal showing a single fruit in three typical stages of operation.

In the figures, the same reference numerals and letters are used to designate identical or equivalent components.

Figure 1:
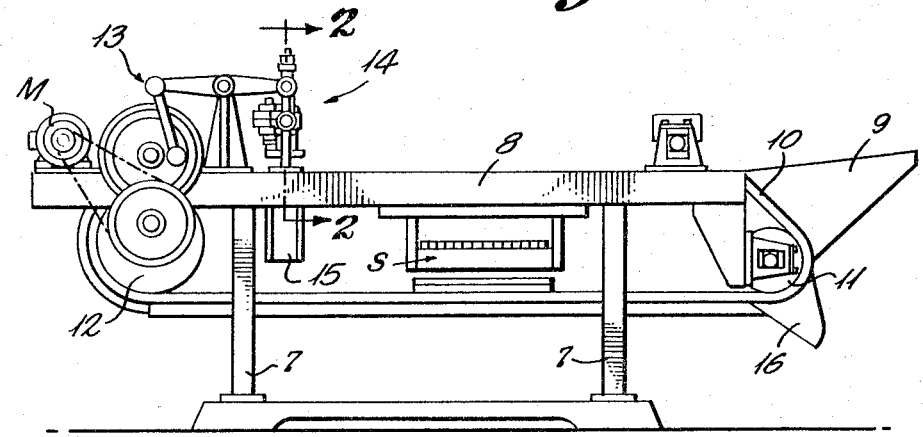
FIG. 1 is a lateral elevation of the machine.

The machine shown in FIGURE 1 rests on a base provided with uprights 7 which support side-members 8, on which is mounted a head 14 carrying the orientating-stoner apparatus.

A charging hoper 9 loads the olives 36 onto an endless conveyor belt 10 which consists of small, articulated plates having rollers which run on rails 10" carried by the side members 8, each of the olives 36 being received in an open bottomed cell 31 provided in the plates.

The belt 10 is mounted on wheels 11 and 12 which rotate in bearings integral with the frame of the machine. The wheel 12 is rotated by the motor M and by rotatory and transmission gears generally indicated by the reference numeral 13, causing the belt 10 to carry the olives 36 with an intermittent feed from the charging hopper 9 towards the orientating-stone-removing apparatus of head 14. The stones 37 (FIGURES 3 to 5) and the pulp which is removed therewith from the olives 36, are carried away by means of a discharge chute 15 (FIGURE 1), whilst the stoned olives 36, still contained in their cells 31, arrive below mechanical stuffing apparatus generally indicated by the reference letter S, and are subsequently discharged from the machine after being stuffed by the chute 16.

The head 14 is adapted to function in conjunction with the drive means for the intermittent feed of the conveyor belt 10. The head 14 can be associated, with consequent modifications to the supports and transmissions, with means for processing fruit 36 carried on the belt 10 with a continuous feed movement without the essential features of the invention requiring to be modified for the purpose.

The motor M drives the head 14 through belts or chains, connecting rods and transmission gears indicated generally at 13. The head 14, consists of a plate 20, carrying directly or indirectly the orientatory and stone removal means, and can slide by means of bushings 19 along uprights 17 mounted on the side members 8 and kept equidistant by a cross-member 18. The plate 20 is moved along the uprights 17 by a rocker mechanism diagrammatically shown in FIG. 1.

Figure 2:
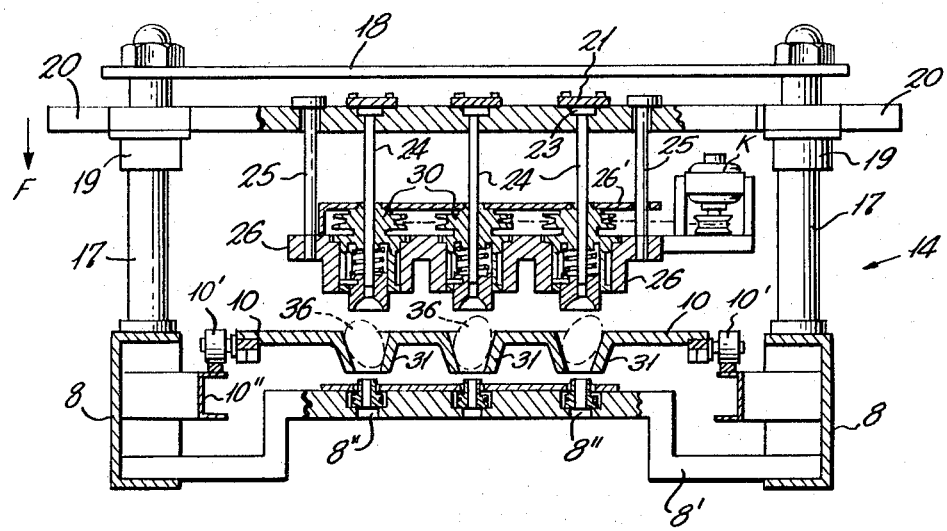
FIG. 2 is a view on an enlarged scale, taken along the line 2—2 indicated on FIG. 1, with some portions being shown in cross section.
Figures 3, 4, 5:
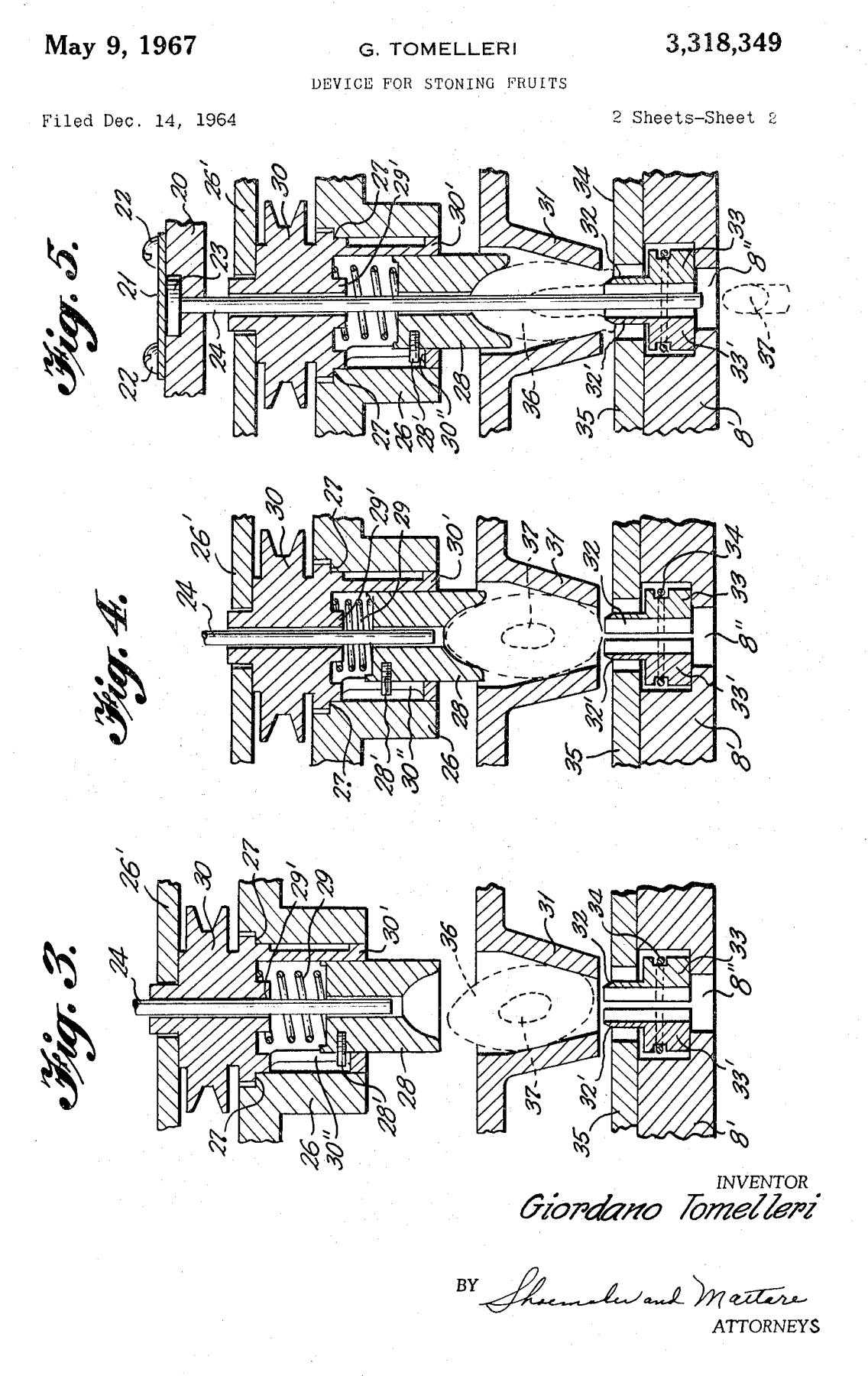

Secured in seatings provided in the plate 20, see FIGURES 2 and 5, closed by means of small plates 21, are the heads 23 of ejector members 24. From the plate 20 is freely suspended, by means of recessed head bolts 25, a plate 26 which, in conjunction with a housing 26', supports in seatings 27 pulleys 30 which derive their drive through appropriate transmission from the motor K. The pulleys 30 transmit said drive to orientating heads 28 each housed in a hollow cylindrical extension 30' of each pulley 30.

The cylindrical orientating heads 28 have a central bore as do the pulleys 30, the bores are aligned and allow passage of the ejector members 24 and terminate in a recessed portion provided in the head 28. Each head 82 is caused to rotate with the movements of the cylindrical extension 30' by means of a pin 28' which is secured at one end to the head 28 and has a portion projecting into an aperture or slot 30" provided in the hollow cylindrical extension 30.

The orientating heads 28 can be easily pushed upwards relative to the extensions 30 and ejectors 24 (see FIG. 3), by overcoming the action of a spring 29 disposed between each orientating head 28 and a seating 29' which locates the spring. This feature makes it possible to process olives of widely differing longitudinal size without those of the larger size being squashed by the orientating head.

As will be seen more clearly with reference to FIG. 2, the machines includes a rod-carrier plate 8' rigid with the side members 8 of the machine. The plate 8' is provided with holes 8" to allow the stones 37 to fall into the chute 15 of FIG. 1. With reference to FIGS. 2, 3 and 4, it will be observed that each hole 8" accommodates a cylindrical member made in two parts 32–32' which have their lower extremities formed as bases 33–33' accommodated in seatings provided in plate 8. This allows them a certain lateral displacement when it becomes necessary to pass a stone through the hole in the cylindrical member which is of larger diameter than the minimum inside diameter of the cylindrical member. The bases 33–33' of the parts 32–32' are each provided with a circumferentially extending channel in which is arranged an annular spring 34 the purpose of which is to bring the two parts of the cylindrical member closer together as soon as a particularly large stone has been ejected. A backplate 35 provided with holes to allow the ends of the parts 32, 32' to protrude retains the bases 32–32' in their seatings in the plate 8'. When an articulated plate forming part of the belt 10 arrives under head 14, the longitudinal axes of the cells 31 coincide with the median longitudinal axes of the ejectors 24 and parts 32–32' and, during the intermittent feeding of the belt 10, the processes of orientating and stoning the olives 36 are performed. The plate 20 reciprocated by the drive 13 commences to move downwardly towards the olives 36 in the direction of the arrow F and when the cavities provided in the heads 28 come into contact with the uper ends of the olives 36, the motor K sets in motion the pulleys 30 and, therefore, causing the orientating heads 28 to rotate which straighten the olives 36 inside the cells 31.

Once the olives 36 have been orientated, the motor K can be rendered inoperative by means of a cut-out switch (not shown), and then the stone-removing phase shown in FIGS. 4 and 5 can be performed.

The ejectors 24 penetrate the body of the olives 36 and cause them to project a little from the open bottom of the cell 31' and rest slightly on the parts 32-32' of the cylindrical member, as shown in FIG. 5. The ejectors 24 strike against the stones 37 and push them through the holes in the cylindrical member, the parts 32-33 being urged open against the action of the spring 24 if necessary.

When the stone-ejection phase is completed, the plate 20 moves in the direction opposite to that indicated by the arrow F and withdraws the ejectors 24 from the olives 36 which are held inside the cells 31 by the flared recessed portions of orientating heads 28. As plate 20 continues its movement away from the belt 10, the heads of the bolt 25, strike against the plate 20, returning the plate 26 to the position shown in FIG. 2, thus also moving the orientating heads 28 away from the olives 36 which remain immobile inside the cells.

The belt 10 will then move one step onwards and carry a plate or a series of plates under the head 14 for carrying out of a fresh orientating and stoning phase.

It is evident that any formal modifications may be made to the structure of the invention for practical purposes without departing from the scope of the appended claims.

What I claim is:

1. A device for removing a stone from a fruit comprising conveyor means, at least one cavity provided on the conveyor means adapted to contain a fruit, said cavity having a base portion, an aperture being provided in said base portion, drive means to move the conveyor means intermittently, rotatable means for rotating said fruit to position the fruit correctly in the cavity, drive means to rotate said rotatable means, means to move said rotatable means into contact with and away from the fruit, an ejector member movable into contact with and withdrawable from the fruit, said ejector member being adapted to penetrate the fruit after said rotatable means has moved into contact with and has positioned said fruit correctly in said cavity, said ejector member being adapted to push the stone out of the fruit and through said aperture in the base of the cavity, means being provided to maintain said rotatable means in contact with said fruit when said ejector is being withdrawn from said fruit to retain the fruit within the cavity.

2. A device as claimed in claim 1 further comprising a plate moveable towards and away from the conveyor means, said rotatable means for rotating said fruit including a plate member freely suspended from said plate, a drive transmitting member having a hollow cylindrical extension being mounted for rotation in said plate member, spring means located within said extension, means for rotating said drive transmitting member, a head member slidable within said cylindrical extension and having one end engageable with said spring means, means for transmitting the rotational movement of said hollow cylindrical extension to said head member, said head member having at its end opposite the spring a recess adapted to engage the fruit, a central bore provided in said drive transmitting member, a central bore provided in said head, said ejector member extending into said central bores.

3. A device as claimed in claim 2 further comprising two uprights positioned one on each side of the conveyor means, said plate extending between and slidable on said uprights, means to positively secure said ejector member to said plate, initial movement of said plate towards said conveyor means being adapted to engage said recess provided on said head member with said fruit, further movement of said plate causing said ejector member to slide within said central bore provided in said head member in order to penetrate the fruit and push said stone from the fruit, said device further comprising a fixed member disposed below said cavity provided on said conveyor, a cylindrical member supported on said fixed member extending towards but spaced from said aperture in said cell, said fruit being urged into contact with said cylindrical member during penetration of said ejector member.

4. A device as claimed in claim 3 in which the cylindrical member comprises two semi-circular members each having a longitudinally extending recess co-operating to form a longitudinally extending bore, a peripheral groove provided in the outer periphery of each semi-circular member, a circular spring engaged in said peripheral grooves adapted to resiliently hold the two semi-circular members together, said stone ejected from said fruit being passed through the bore formed by the co-operating recesses, said spring enabling the bore to be enlarged for passage therethrough of stones having an external diameter larger than the diameter of said bore when said spring is unstressed.

References Cited by the Examiner

UNITED STATES PATENTS

| | | | |
|---|---|---|---|
| 1,010,848 | 12/1911 | Bodman et al. | 146—27 |
| 2,567,591 | 9/1951 | Ashlock | 146—19 |

FOREIGN PATENTS

| | | |
|---|---|---|
| 450,669 | 7/1949 | Italy. |
| 603,598 | 4/1960 | Italy. |

WILLIAM W. DYER, Jr., *Primary Examiner.*

W. GRAYDON ABERCROMBIE, *Examiner.*